United States Patent
Haller

(10) Patent No.: US 9,227,529 B2
(45) Date of Patent: Jan. 5, 2016

(54) UTILITY VEHICLE SEAT WITH A ROTATION ADJUSTMENT DEVICE OVERLOAD PROTECTION UNIT

(71) Applicant: GRAMMER AG, Amberg (DE)

(72) Inventor: Erwin Haller, Birgland (DE)

(73) Assignee: GRAMMER AG, Amberg (DE)

( * ) Notice: Subject to any disclaimer, the term of this patent is extended or adjusted under 35 U.S.C. 154(b) by 7 days.

(21) Appl. No.: 14/109,540

(22) Filed: Dec. 17, 2013

(65) Prior Publication Data

US 2014/0217796 A1  Aug. 7, 2014

(30) Foreign Application Priority Data

Dec. 18, 2012 (DE) .......................... 10 2012 112 528

(51) Int. Cl.
| | |
|---|---|
| *B60N 2/14* | (2006.01) |
| *B60N 2/427* | (2006.01) |
| *B60N 2/50* | (2006.01) |
| *B60N 2/06* | (2006.01) |

(52) U.S. Cl.
CPC .. *B60N 2/14* (2013.01); *B60N 2/06* (2013.01); *B60N 2/062* (2013.01); *B60N 2/146* (2013.01); *B60N 2/42709* (2013.01); *B60N 2/508* (2013.01); *B60N 2205/20* (2013.01)

(58) Field of Classification Search
CPC ............................... B60N 2/14; B60N 2/42709
USPC ............... 297/344.21, 344.26, 216.1, 216.16, 297/216.19; 248/349.1, 425
See application file for complete search history.

(56) References Cited

U.S. PATENT DOCUMENTS

| | | | |
|---|---|---|---|
| 2,854,065 A | | 9/1958 | Fox |
| 3,338,622 A | * | 8/1967 | Bachmann ................. 296/65.07 |
| 3,572,817 A | | 3/1971 | Colautti et al. |
| 3,622,202 A | | 11/1971 | Brown |
| 3,659,895 A | | 5/1972 | Dresden |
| 4,169,625 A | * | 10/1979 | Petersen ................. 297/344.26 |
| 4,316,631 A | | 2/1982 | Lenz et al. |
| 4,344,597 A | | 8/1982 | Eimen |

(Continued)

FOREIGN PATENT DOCUMENTS

| | | |
|---|---|---|
| CA | 2337695 | 8/2001 |
| CN | 202480912 | 10/2012 |

(Continued)

OTHER PUBLICATIONS

U.S. Appl. No. 14/109,117, filed Dec. 17, 2013, Haller.

(Continued)

*Primary Examiner* — Peter Brown
(74) *Attorney, Agent, or Firm* — Sheridan Ross P.C.

(57) ABSTRACT

The invention relates to a utility vehicle seat with a seat part, with a backrest part and with a seat substructure for arrangement on a bodywork part of a utility vehicle. The seat substructure includes a rotation adjustment device for rotating at least the seat part with respect to the bodywork part with a ball bearing unit, and with a rotating shell part which is rotatable with respect to a stationary shell part. The utility vehicle seat further includes a rotation adjustment device overload protection unit with support elements by means of which the rotating shell part and the stationary shell part are additionally capable of being supported with respect to each other when the carrying capacity of one of the circular ball tracks reaches or exceeds a critical deformation value.

10 Claims, 3 Drawing Sheets

(56) References Cited

U.S. PATENT DOCUMENTS

| | | | |
|---|---|---|---|
| 4,401,287 A * | 8/1983 | Moeser | 248/425 |
| 4,570,997 A | 2/1986 | Tanizaki et al. | |
| 4,792,188 A * | 12/1988 | Kawashima | 297/344.26 |
| 4,834,452 A | 5/1989 | Goodrich | |
| 5,042,864 A * | 8/1991 | Mochizuki | 296/65.07 |
| 5,161,765 A | 11/1992 | Wilson | |
| 5,292,179 A | 3/1994 | Forget | |
| 5,437,494 A | 8/1995 | Beauvais | |
| 5,518,294 A | 5/1996 | Ligon et al. | |
| 5,568,960 A | 10/1996 | Oleson et al. | |
| 5,704,729 A | 1/1998 | Carnahan et al. | |
| 5,720,462 A | 2/1998 | Brodersen | |
| 5,853,221 A | 12/1998 | Thoman et al. | |
| 5,882,076 A | 3/1999 | Garelick et al. | |
| 6,021,989 A * | 2/2000 | Morita et al. | 248/349.1 |
| 6,079,786 A | 6/2000 | Kirkland et al. | |
| 6,158,300 A | 12/2000 | Klingler | |
| 6,164,722 A | 12/2000 | Mabey | |
| 6,325,456 B1 | 12/2001 | Carnahan | |
| 6,402,114 B1 | 6/2002 | Carnahan et al. | |
| 6,557,919 B2 | 5/2003 | Suga et al. | |
| 6,575,420 B2 | 6/2003 | Yoshida et al. | |
| 6,722,737 B2 * | 4/2004 | Kanai | 297/344.22 |
| 6,877,811 B1 | 4/2005 | Garelick | |
| 7,036,883 B1 | 5/2006 | Thompson et al. | |
| 7,108,325 B2 | 9/2006 | Williamson et al. | |
| 7,121,608 B2 | 10/2006 | Billger et al. | |
| 7,506,932 B2 | 3/2009 | Bostrom et al. | |
| 7,520,567 B2 | 4/2009 | Billger et al. | |
| 7,845,703 B2 | 12/2010 | Panzarella et al. | |
| 7,950,740 B2 * | 5/2011 | Bunea et al. | 297/344.23 |
| 8,033,589 B2 | 10/2011 | Kusanagi et al. | |
| 9,085,245 B2 | 7/2015 | Haller | |
| 2002/0130528 A1 | 9/2002 | Mans | |
| 2002/0149250 A1 | 10/2002 | Silvia | |
| 2002/0190560 A1 | 12/2002 | Kohl et al. | |
| 2003/0189370 A1 | 10/2003 | Hemmer et al. | |
| 2004/0066074 A1 | 4/2004 | Ovitt | |
| 2004/0188582 A1 | 9/2004 | Flynn et al. | |
| 2004/0232399 A1 | 11/2004 | Stone | |
| 2006/0226685 A1 | 10/2006 | Priepke et al. | |
| 2008/0211284 A1 | 9/2008 | Mutou et al. | |
| 2009/0102271 A1 | 4/2009 | Squires et al. | |
| 2009/0284061 A1 | 11/2009 | Maier et al. | |
| 2010/0001169 A1 | 1/2010 | Armo et al. | |
| 2010/0117413 A1 | 5/2010 | Squires | |
| 2010/0117428 A1 | 5/2010 | Deml et al. | |
| 2011/0074198 A1 | 3/2011 | Iwasaki et al. | |
| 2013/0193729 A1 | 8/2013 | VanMiddendorp et al. | |
| 2014/0167470 A1 | 6/2014 | Lorey | |
| 2015/0015039 A1 | 1/2015 | Brand et al. | |
| 2015/0035334 A1 | 2/2015 | Roth et al. | |

FOREIGN PATENT DOCUMENTS

| | | |
|---|---|---|
| DE | 1116987 | 11/1961 |
| DE | 2828503 | 1/1980 |
| DE | 3127625 | 6/1982 |
| DE | 3218379 | 11/1983 |
| DE | 3708399 | 9/1987 |
| DE | 4415933 | 11/1994 |
| DE | 69202551 | 2/1996 |
| DE | 69721383 | 3/2004 |
| DE | 60118068 | 8/2006 |
| DE | 202006010184 | 9/2006 |
| DE | 102007021141 | 9/2008 |
| DE | 102008058409 | 7/2009 |
| DE | 102010017328 | 12/2011 |
| DE | 1020100053752 | 6/2012 |
| DE | 102011009543 | 8/2012 |
| DE | 102012112525 | 6/2014 |
| EP | 0515275 | 11/1992 |
| EP | 0921962 | 6/1999 |
| EP | 1659021 | 5/2006 |
| EP | 1824358 | 8/2007 |
| EP | 1924462 | 5/2008 |
| EP | 2213504 | 8/2010 |
| EP | 2293959 | 3/2011 |
| FR | 2201659 | 4/1974 |
| GB | 525663 | 9/1940 |
| JP | H06-316233 | 11/1994 |
| JP | H10-217811 | 8/1998 |
| JP | H11-198692 | 7/1999 |
| JP | 2002-211284 | 7/2002 |
| JP | 2002-306267 | 10/2002 |
| JP | 2003-063288 | 3/2003 |
| JP | 2004-203160 | 7/2004 |
| KR | 10-2013-0056092 | 5/2013 |
| WO | WO 2004/056605 | 7/2004 |
| WO | WO 2007/028473 | 3/2007 |
| WO | WO 2010/114966 | 10/2010 |

OTHER PUBLICATIONS

U.S. Appl. No. 14/109,166, filed Dec. 17, 2013, Ott.
U.S. Appl. No. 14/109,425, filed Dec. 17, 2013, Haller.
U.S. Appl. No. 14/109,493, filed Dec. 17, 2013, Haller.
Official Action (no English translation available) for German Patent Application No. 102012112528.7 dated Nov. 14, 2013, 3 pages.
U.S. Appl. No. 14/726,798, filed Jun. 1, 2015, Haller et al.
Extended Search Report for European Patent Application No. 13196909.9, dated Jun. 17, 2015, 3 pages.

* cited by examiner

UTILITY VEHICLE SEAT WITH A ROTATION ADJUSTMENT DEVICE OVERLOAD PROTECTION UNIT

CROSS-REFERENCE TO RELATED APPLICATIONS

This application claims the benefit of German Application No. 10 2012 112 528.7 filed Dec. 18, 2012, the disclosure of which is incorporated herein by reference.

DESCRIPTION

The invention relates to a utility vehicle seat with a seat part, with a backrest part and with a seat substructure for the arrangement on a bodywork part of a utility vehicle, in which the seat substructure comprises a rotation adjustment device for rotating at least the seat part with respect to the bodywork part with a ball bearing unit, with a rotationally fixed stationary shell part and with a rotating shell part which is rotatable with respect to the rotationally fixed stationary shell part, and in which the ball bearing unit comprises at least one ball rim part which is arranged between the rotationally fixed stationary shell part and the rotatable rotating shell part with respect to circular ball tracks of the rotationally fixed stationary shell part and the rotatable rotating shell part, in such a way that the rotatable rotating shell part is arranged supported in a rotatably movable manner with respect to the rotationally fixed stationary shell part.

Generic vehicle seats with rotation adjustment devices of this type for the rotation of the vehicle seat about a vertical axis are well known from the prior art. In order that the vehicle seat can be rotated in a smoothly running and play-free manner about the vertical axis, in particular in order to occupy different working positions of the seat, the rotation adjustment devices are frequently provided with ball rims in which a plurality of hardened balls are held in a defined manner in a cage. These ball rims are mounted with respect to circular ball tracks in such a way that the hardened balls can follow these circular ball tracks when the vehicle seat is rotated about the circular axis. The circular ball tracks in turn are impressed in plate parts which consist of a softer material than the hardened balls. In the case of high critical dynamic, but also static, stresses of the rotation adjustment device, for example on account of knocks acting upon the vehicle seat as a result of violent movements of the vehicle or the like, these softer plate parts yield structurally in the course of time, so that ruts or other damage to the running surface can arise as a consequence of the harder balls on the softer plate parts. This damage to the running surface frequently causes play which is perceptible in a harmful manner and which steadily increases, so that a considerable loss of comfort has to be accepted or frequently costly repairs become necessary. This is frequently the case in particular with respect to utility vehicle seats since these are subject to higher stresses.

The object of the invention is to further develop generic vehicle seats with respect to the rotation adjustment device thereof in such a way that at least the drawbacks mentioned above are overcome.

The object of the invention is attained by a utility vehicle seat with a seat part, with a backrest part and with a seat substructure for arrangement on a bodywork part of a utility vehicle, in which the seat substructure comprises a rotation adjustment device for rotating at least the seat part with respect to the bodywork part with a ball bearing unit, with a stationary shell part and with a rotating shell part which is rotatable with respect to the stationary shell part, and in which the ball bearing unit comprises at least one ball rim part which is arranged between the stationary shell part and the rotating shell part with respect to circular ball tracks of the stationary shell part and the rotating shell part, in such a way that the rotating shell part is arranged supported in a rotatably movable manner with respect to the stationary shell part, wherein the utility vehicle seat is characterized by a rotation adjustment device overload protection unit with support elements which are arranged in a stationary manner with respect to the stationary shell part or the rotating shell part and by means of which the rotating shell part and the stationary shell part are additionally capable of being supported with respect to each other when the carrying capacity of one of the circular ball tracks reaches or exceeds a critical deformation value.

On account of this rotation adjustment device overload protection unit according to the invention it is possible for critical stressing states on component parts and/or areas of component parts, such as the circular ball tracks, to be prevented in a structurally simple manner, as a result of which the service life of the rotation adjustment apparatus can be considerably increased. In particular, an excellent anti-roll support between the two shell parts of the rotation adjustment device can be achieved as a result.

To this end it is preferable for the support elements to be arranged so as to act directly between the rotating shell part and the stationary shell part, so that if necessary a direct mutual support of these two shell parts with respect to each other can take place, so that a structural unit of extremely stable design per se can be produced.

To this end the support elements are ideally arranged in a stationary manner on the stationary shell part.

In all events these support elements make it possible for the rotating shell part and the stationary shell part always to maintain a minimum distance from each other even at the edge areas thereof situated radially further towards the outside with respect to a common centre axis. The centre axis coincides in this case with a vertical axis about which the rotating shell part rotates.

In the case of high dynamic as well as static stressing, as in the prior art as well, the shell parts designed in the form of plate parts are overcome as before. However, before the plastic deformation of the shell parts, in particular the circular ball tracks thereof, can occur in the present case on account of the stressing increasing to a critical degree, the support elements are stressed to an increasing degree with supporting forces as a result of the inclination of the two shell parts with respect to each other, until the support elements take on carrying functions and in this case absorb supporting forces extending in particular in alignment with the axis of rotation of the rotating shell part and transmit them to the stationary shell part. As a result, a critical increase in the stressing on the circular ball tracks of the rotation adjustment device can be prevented in an effective manner.

A critical deformation occurs in the sense of the invention, in particular when a plastic deformation, i.e. an irreversible deformation, is involved. The expression "rotating shell part" describes in the sense of the invention a rotationally fixed shell part of the rotation adjustment device. In a corresponding manner the expression "rotating shell part" describes in the sense of the invention a shell part of the rotation adjustment device rotatable with respect to the rotationally fixed stationary shell part.

An advantageous variant of embodiment provides that the support elements are designed in such a way that the support functions thereof start only when the rotating shell part and/or the stationary shell part or one of the circular ball tracks thereof reach or exceed a critical resilient deformation value.

Critical resilient deformation values of this type depend inter alia upon the choice of the materials from which the shell parts are produced. The selected dimensions of the components, however, also play a role in this case.

In addition, it is advantageous for the support elements to have support functions which are capable of being developed in a manner dependent upon a degree of compression. This can ensure that in the case of a non-critical stressing of the rotation adjustment device the support elements cause only a sliding contact, as a result of which a rotatability of the rotation adjustment device is not affected or is affected to only a negligibly slight degree.

In this case it is advantageous for the support elements to be arranged without contact or in a sliding manner with respect to the rotating shell part or the stationary shell part in a non-critical deformation state of the rotating shell part and/or the stationary shell part, in order not to restrict the rotatability of the rotation adjustment device unnecessarily in normal operation. This can ensure that the rotation adjustment device overload protection unit can act only at very high stresses, for example if the utility vehicle is standing at an extreme inclination and, as a result, causes the at least one ball rim part to be very highly stressed only in part.

The present support elements can be attached virtually to any component parts of the seat substructure. The rotation adjustment device can be implemented in a structurally simple manner if the support elements are arranged on the rotating shell part or preferably on the stationary shell part. In particular, on account of the preferred choice of arrangement the number of component parts to be additionally moved on the rotating shell part is not increased in a disadvantageous manner.

It is preferable for the support elements to have in each case a sliding support face which is arranged facing the rotating shell part or the stationary shell part. This sliding support face can ensure the rotatability of the rotation adjustment apparatus highly satisfactorily even if the support elements additionally support the shell parts of the rotation adjustment apparatus with respect to each other.

If the sliding support face is arranged plane-parallel to a sliding plane of the stationary shell part or the stationary shell part, an advantageously large force transmission area can be formed between the rotating shell part and the stationary shell part by means of the sliding support face and the sliding plane.

A particularly effective support of the two shell parts can be achieved when the support elements are arranged distributed outside the circular ball tracks and in the peripheral direction of the circular ball tracks.

It is to be understood that a varying number of support elements can be provided. In this way for example, eight or more support elements of this type can be present. For a satisfactory and reliable operability of the rotation adjustment device overload protection unit, however, it is sufficient for four support elements to be arranged uniformly distributed in the peripheral direction of the circular ball tracks. In addition, as a result of this smaller number a frictional value stressing on the rotation adjustment device can be kept within a normally acceptable range on account of the support elements.

If the support elements are produced in several pieces, various functional properties can be achieved in a structurally simple manner.

If the support elements comprise a sliding part and a spring part in each case, both particularly good sliding properties and particularly good springing properties can be combined.

It is advantageous for the sliding part to be arranged embedded inside the spring part in such a way that it can make the sliding support face available without difficulty.

It is to be understood that, in particular, the spring part can be designed in various ways. Ideally it is designed in the form of a disc spring part which comprises a collar area for support on the carrier component. As a result of this, very good springing properties can be achieved.

The sliding part can be designed in a structurally simple manner with a cylindrical main body.

In particular, good sliding properties with respect to the sliding support face can be achieved if the support elements are produced at least in part from a plastics material or a compound thereof.

Further advantages, aims and properties of the present invention are explained with reference to the accompanying drawing and the following description, in which a utility vehicle seat with a rotation adjustment apparatus and with a rotation adjustment device overload protection unit comprising additional support elements is illustrated and described by way of example. In the drawing FIG. 1 is a diagrammatic, perspective view of a utility vehicle seat with seat substructure which comprises a horizontal movement apparatus and which has a rotation adjustment device and a rotation adjustment device overload protection unit comprising support elements;

Figure 1:
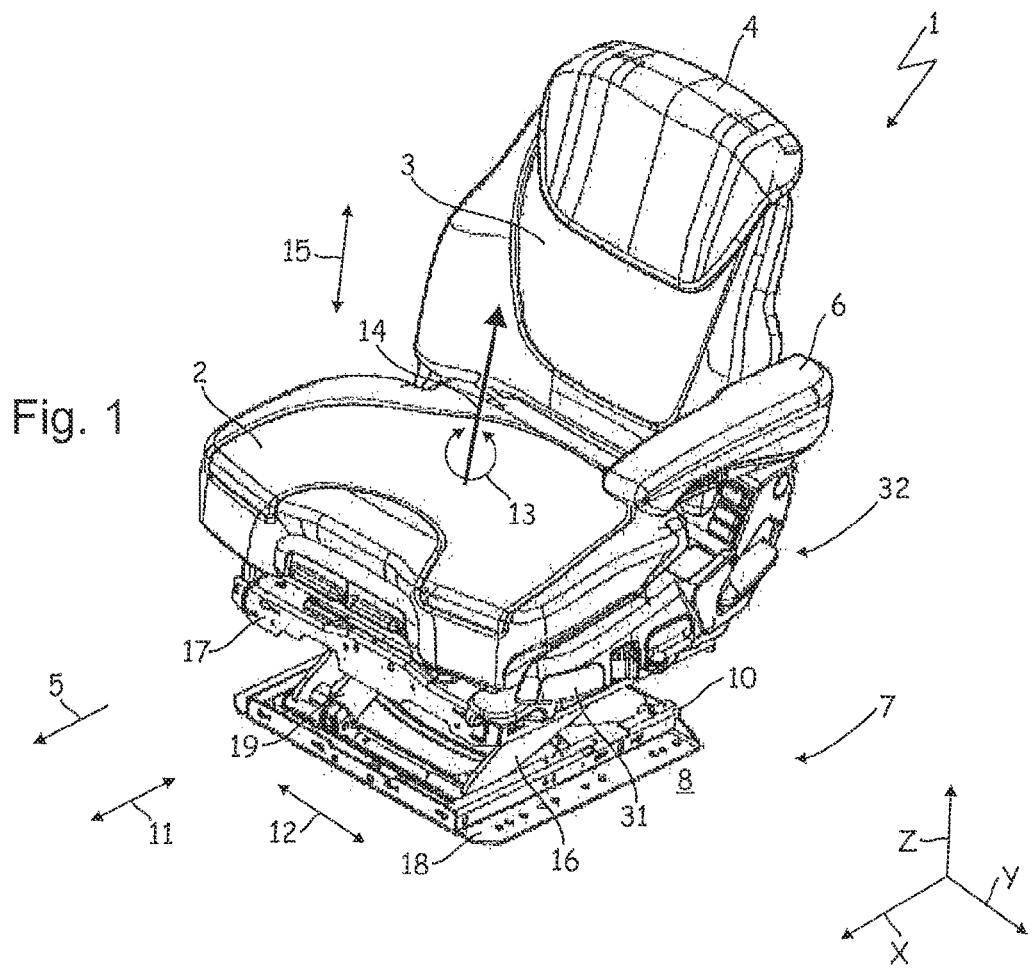

The utility vehicle seat 1 shown in FIG. 1 comprises a seat part 2 for a passenger to sit upon and a backrest part 3 to support the back of the passenger. In this embodiment the backrest part 3 is provided with a head support part 4. In addition, an armrest part 6 is also fastened laterally to the backrest part 3 on the right as viewed in the direction of forward travel 5. Furthermore, the utility vehicle seat 1 also comprises a seat substructure 7, by means of which the utility vehicle seat 1 is fastened in its entirety to a bodywork part 8, such as for example a floor of a utility vehicle cab.

In order to be able to adapt the utility vehicle seat 1 in as many ways as possible to the most widely varying demands of use of the passenger and also to be able to provide an optimum seating comfort, in this embodiment the seat substructure 7 has a horizontal movement apparatus 9 and a vertical movement apparatus 10.

By means of the horizontal movement apparatus 9 at least the seat part 2 and components connected thereto, such as for example the backrest part 3, can be moved in a translational manner in a longitudinal adjustment direction 11 (x axis) and in a translational manner in a lateral adjustment direction 12 (y axis) as well as in a rotational manner about a vertical axis 14 (z axis) in a rotation adjustment direction 13, as is further explained below. On account of its compact design the horizontal movement apparatus 9 has only a very low structural height of 57 mm in this embodiment.

By means of the vertical movement apparatus 10 at least the seat part 2 and components connected thereto, such as likewise the backrest part 3, can be moved in a translational manner with respect to the vertical axis 14 in a vertical adjustment direction 15. To this end the vertical movement apparatus 10 comprises a scissors frame 16 which is arranged between a cover plate 17, which carries the horizontal movement apparatus 9, the vertical movement apparatus 10 and a base plate 18 of the vertical movement apparatus 10, in such a way that the horizontal movement apparatus 9 is mounted so as to be movable vertically with respect to the base plate 18. In addition, the vertical movement apparatus 10 also comprises a damper spring device 19 for springing and damping a vertical movement on the utility vehicle seat 1 in the vertical direction 15.

Figure 2:
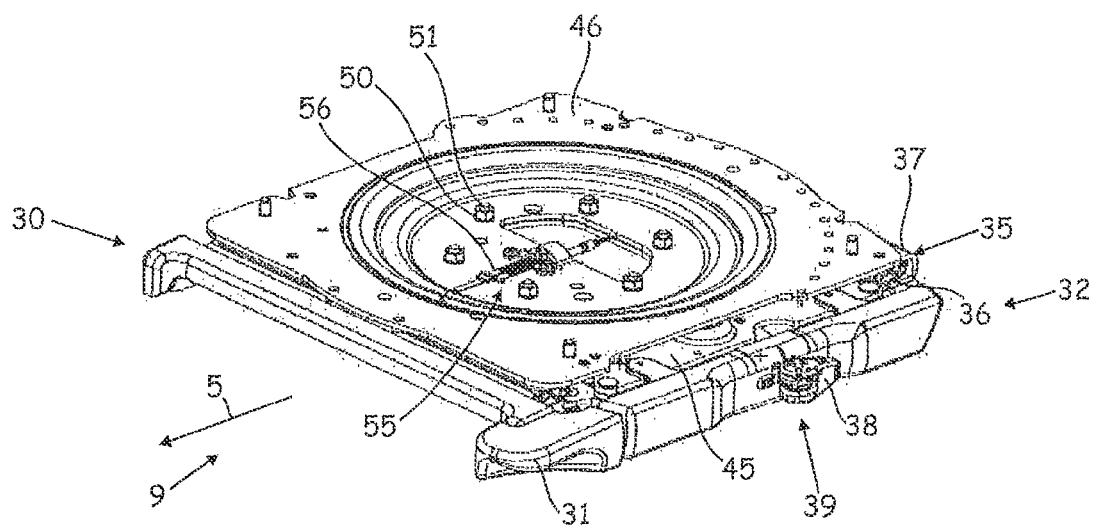
FIG. 2 is a diagrammatic, perspective view of the horizontal movement apparatus of the seat substructure of the utility vehicle seat as shown in FIG. 1.
Figure 3:
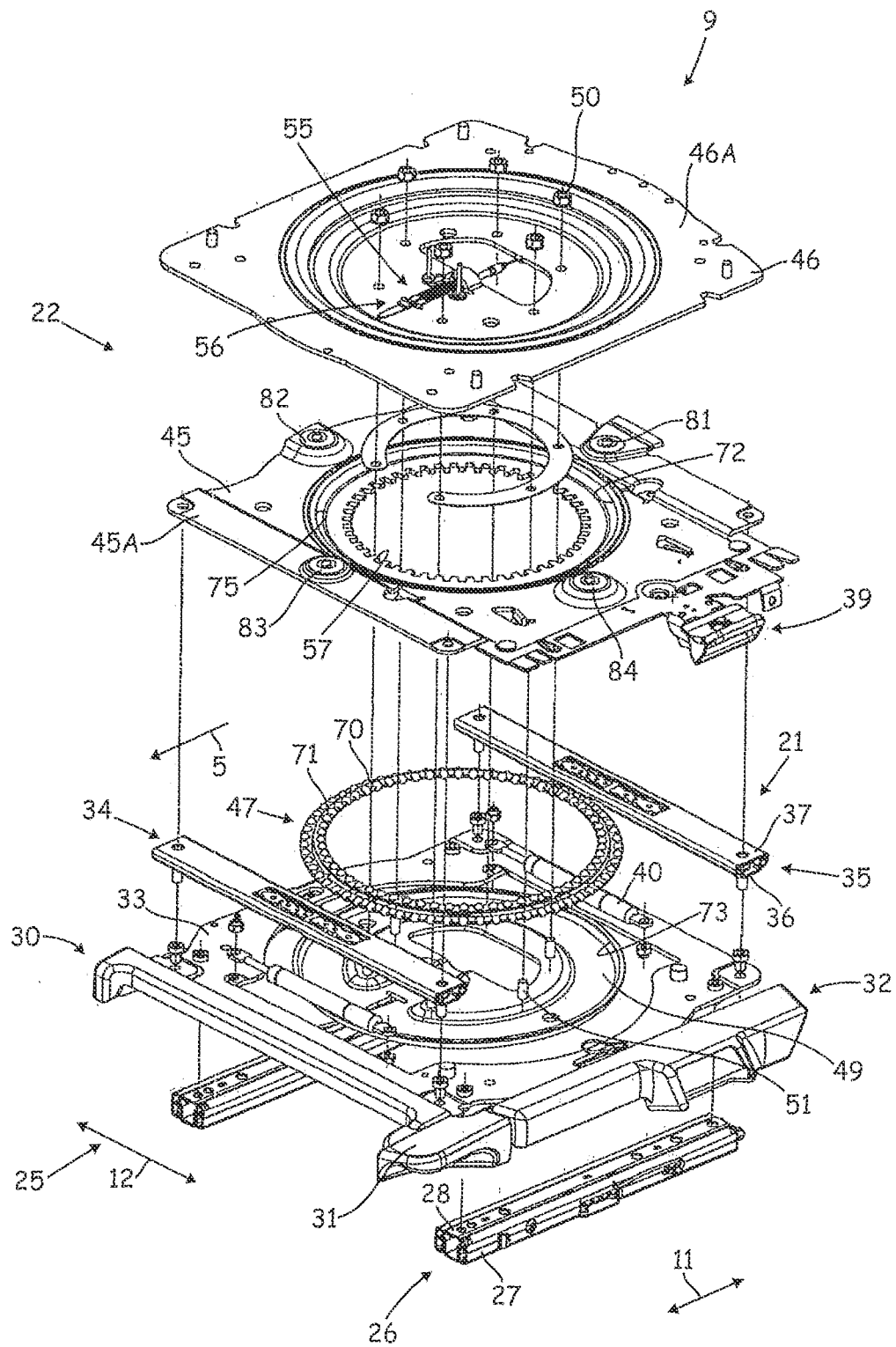
FIG. 3 is a diagrammatic, exploded view of the horizontal movement apparatus as shown in FIGS. 1 and 2.
Figure 4:
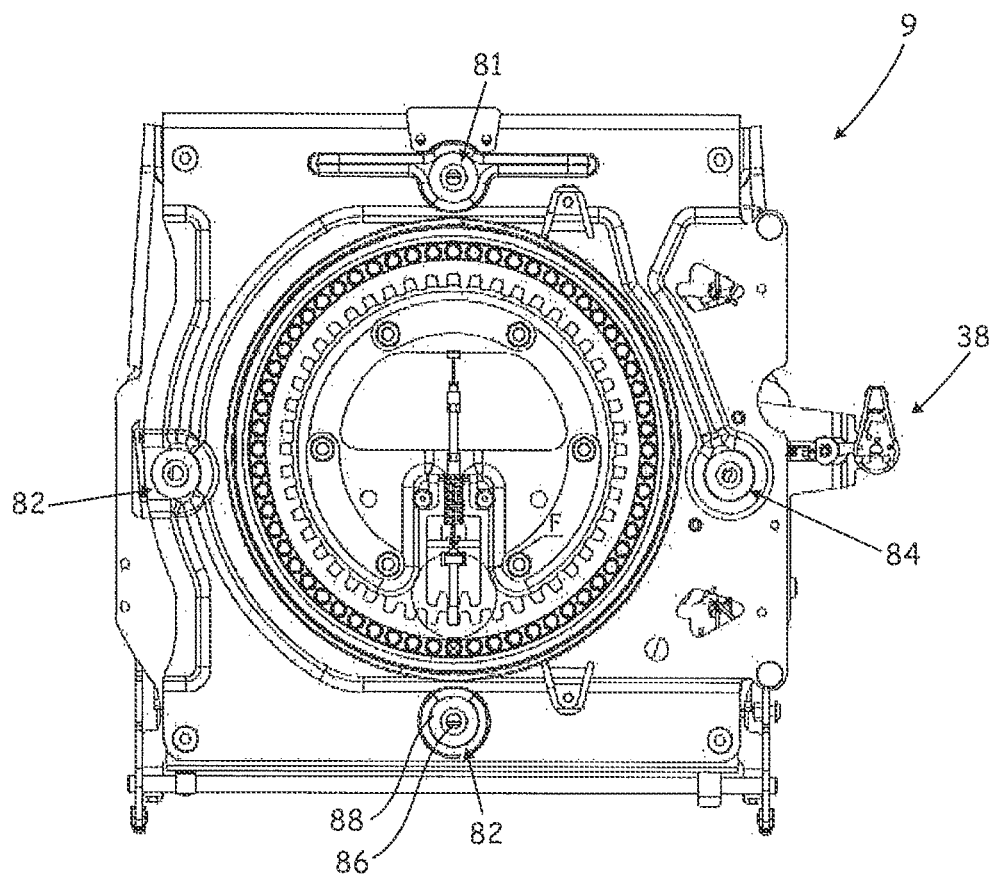
FIG. 4 is a diagrammatic plan view on a lower shell part of the rotation adjustment device as shown in FIGS. 1 to 3.

The horizontal movement apparatus 9 shown in greater detail in FIGS. 2 and 3 comprises a longitudinal adjustment device 20, a transverse adjustment device 21 and a rotation adjustment device 22, in order to be able to move or set the utility vehicle seat 1 in the sense of the aforesaid longitudinal adjustment direction 11, lateral adjustment direction 12 and rotation adjustment direction 13 respectively. In another, no less advantageous, embodiment the horizontal movement apparatus 9 can also have only one of the adjustment devices 20, 21 and 22 or any other desired combination thereof.

By means of the longitudinal adjustment device 20 a front longitudinal adjustment path of 120 mm and a rear longitudinal adjustment path of 90 mm with respect to a neutral longitudinal position can be achieved, whereas by means of the transverse adjustment device 21 a transverse adjustment path about a neutral transverse position of +/−25 mm can be achieved. By means of the rotation adjustment device 22 a pivoting movement of 60° about a neutral rotational position and/or an 180° rotation can be achieved in 7.5° steps in each case.

The longitudinal adjustment device 20 is situated essentially at a horizontal level of the rotation adjustment device 22, as a result of which the horizontal movement apparatus 9 has an extremely flat design. The longitudinal adjustment device 20 essentially comprises a right-hand longitudinal rail unit 25 and a left-hand longitudinal rail unit 26 (see FIG. 3), each of the longitudinal rail units 25, 26 comprising a guide rail element 27 (numbered only by way of example) and a slide rail element 28 (likewise numbered only by way of example). The guide rail element 27 is screwed in this case onto the cover plate 17 of the vertical movement apparatus 10, and is thus situated above the vertical movement apparatus 10 between the latter and the seat part 2.

In addition, the longitudinal adjustment device 20 in this embodiment also has associated with it a double locking unit 30 by means of which the respective slide rail element 28 is capable of being locked and unlocked respectively on the corresponding guide rail element 27, so that the utility vehicle seat 1 can be fixed or moved in the longitudinal adjustment direction 11.

In order that the double locking unit 30 may be capable of being actuated manually by the passenger, the longitudinal adjustment device 11 also comprises a gripping element 31 which is capable of being actuated manually and which is arranged laterally adjacent to the seat part 2 and integrated in an operating panel 32 of the utility vehicle seat 1.

The slide rail elements 28 of the longitudinal rail units 25 and 26, the double locking unit 30 and also the gripping element 31 capable of being actuated manually together with its mechanism are fastened to a base carrier plate part 33 of the horizontal movement apparatus 9, on which transverse rail units 34 and 35 of the transverse adjustment device 21 are likewise fastened. Each of the transverse rail units 34 and 35 has a guide-rail transverse element 36 and a slide-rail transverse element 37 in order to permit a movement in accordance with the lateral adjustment direction 12.

In addition, in the illustrations in accordance with FIGS. 1 to 3, still further components of the transverse adjustment device 21 are evident, such as for example a lever element 38—capable of being actuated manually (see in particular FIG. 2)—of a locking unit 39 for fixing or releasing the transverse adjustment device 21 as well as damper elements 40 (numbered only by way of example, see FIG. 3) for damping a lateral oscillation when the transverse adjustment device 21 is released.

The respective guide-rail transverse element 36 is screwed to the base carrier plate part 33, whereas the slide-rail transverse element 37 guided in a corresponding manner on the guide-rail transverse element 36 is arranged in each case on a lower shell part 45.

In this embodiment the lower shell part 45 is associated with the rotation adjustment device 22 and with a suitably shaped two-layer upper shell part 46 it forms a mounting for a ball bearing unit 47, in which case components thereof are inserted into a disc-shaped recess 48 in the lower shell part 45 in the assembled state of the horizontal movement apparatus 9. On the underside the ball bearing unit 47 is completed and protected by a cover element 49 which forms the second portion of the two-layer upper shell part 46, and with the aid thereof the lower shell part 45, the upper shell part 46 and thus also the ball bearing unit 47 of the rotation adjustment device 22 are clamped. To this end, screw nuts 50 are screwed with corresponding threaded bolts 51 of the cover element 49.

The rotation adjustment device 22 is blocked by means of a tooth locking unit 55 which has a slide element 56 which can engage in a toothed rim 57.

In this embodiment, the lower shell part 45 forms a rotationally fixed stationary shell part 45A of the rotation adjustment device 22, which is integrated in a rotationally fixed manner in the seat substructure 7, whereas the existing two-layer upper shell part 46 accordingly forms a rotating shell part 46A which is rotatable with respect to the stationary shell part 45A and which is mounted so as to be rotatable about the vertical axis 14 on the stationary shell part 45A by two ball rim parts 70 and 71 of the ball bearing unit 47 with the aid of the cover element 49.

In addition, the ball bearing unit 47 is characterized by circular ball tracks 72 and 73 (see in particular also FIG. 5) along which the plurality of balls 74 (in this case numbered only by way of example) of the ball rim parts 70 and 71 can roll when the rotating shell part 46A rotates about the vertical axis 14.

In particular, the first circular ball track 72 is formed by a disc-shaped recess 75 pressed into the stationary shell part 45A, in which case the rotating shell part 46A comprises a shaped-out portion complementary thereto. It behaves similarly with respect to the second circular ball track 73 with regard to the cover element 49 (thus not numbered separately).

It is advantageous for the ball bearing unit 47 to be situated at least in part in a horizontal plane (not indicated explicitly here) in which the two longitudinal rail units 26 and 27 are arranged at least in part, so that the structural height of the present horizontal movement apparatus 9 is further reduced to an enormous degree.

The expression "horizontal plane" is to be understood in the sense of the present invention in such a way that this plane extends in the width direction of the vehicle and in the longitudinal direction of the vehicle and is aligned horizontally only when the utility vehicle is situated on underlying ground aligned horizontally. Otherwise this plane is inclined with the inclination of the utility vehicle as a whole in accordance with the width direction and the longitudinal direction of the vehicle.

In order to be able to protect the ball bearing unit 47 and, in particular, the ball tracks 72 and 73 corresponding to it from overloading, the present utility vehicle seat 1 is characterized in particular by a rotation adjustment device overload protection unit 80 which comprises altogether four support elements 81, 82, 83 and 84 by means of which the rotating shell part 46A and the stationary shell part 45A are additionally capable of being supported with respect to each other when the carrying capacity of one of the circular ball tracks 72, 73 reaches or exceeds a critical deformation value.

All the support elements 81, 82, 83, 84 are arranged stationary on the stationary shell part 45A in a manner distributed outside the circular ball tracks 72 and 73 respectively and in the peripheral direction of the circular ball tracks 72 and 73 respectively, as a result of which an effective support action is achieved.

Figure 5:
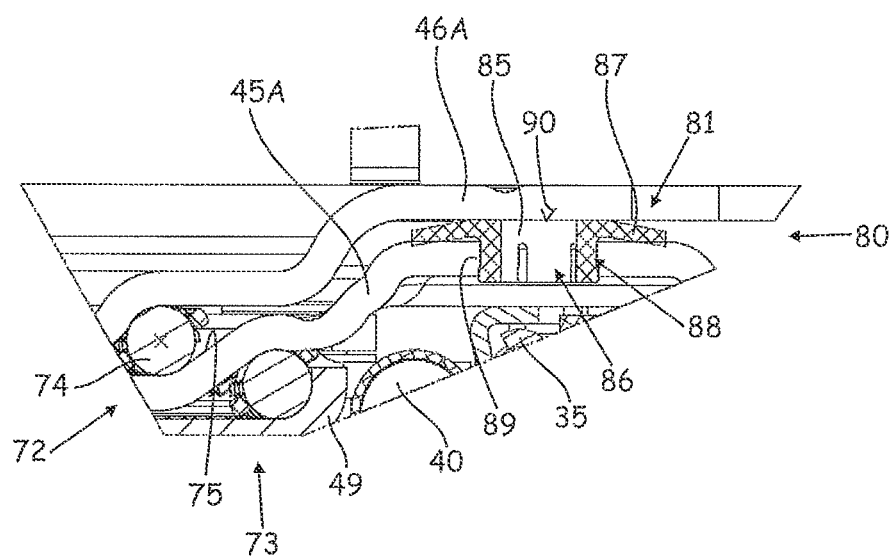
FIG. 5 is a diagrammatic detailed view of a support element of the rotation adjustment device overload protection unit.

It is readily evident from the illustration of FIG. 5 that each of the support elements 81, 82, 83 and 84 comprises a slide part 85, which is designed in the form of a cylindrical component 86 of plastics material, and a spring part 87, which is designed in the form of a spring disc element 88 likewise of plastics material or alternatively from an elastomer material.

The respective support element 81, 82, 83, 84 is introduced with the spring part 87 thereof into a bore 89 of the stationary shell part 45A and, in this way, is fastened in a stationary manner there.

The respective slide part 85 forms a sliding support face 90 which faces the underside of the rotating shell part 46A.

Depending upon whether the utility vehicle seat 1 is a driver's seat or a passenger's seat, the structure, in particular, of the seat substructure 7 can also be designed in a mirror-image manner with respect to the x axis, i.e. the operating panel 32, and in particular the gripping element 31 capable of being actuated manually, can be arranged on the right-hand side of the utility vehicle seat instead of on the left-hand side of the utility vehicle seat.

It is to be understood that the embodiment explained above is only a first design of the utility vehicle seat according to the invention. In this respect the design of the invention is not restricted to this embodiment.

All the features disclosed in the application documents are claimed as being essential to the invention, insofar as they are novel either individually or in combination as compared with the prior art.

LIST OF REFERENCES 1 utility vehicle seat
2 seat part
3 backrest part
4 head support part
5 direction of forward travel
6 armrest part
7 seat substructure
8 bodywork part
9 horizontal movement apparatus
10 vertical movement apparatus
11 longitudinal adjustment direction
12 lateral adjustment direction
13 rotation adjustment direction
14 vertical axis
15 vertical adjustment direction
16 scissors frame
17 cover plate
18 base plate
19 damper spring device
20 longitudinal adjustment device
21 transverse adjustment device
22 rotation adjustment device
25 right-hand longitudinal rail unit
26 left-hand longitudinal rail unit
27 guide rail element
28 slide rail element
30 double locking unit
31 gripping element
32 operating panel
33 base carrier plate part
34 front transverse rail unit
35 rear transverse rail unit
36 guide-rail transverse element
37 slide-rail transverse element
38 lifting element
39 locking unit
40 damper elements
45 lower shell part
45A stationary shell part
46 upper shell part
46A rotating shell part
47 ball bearing unit
48 disc-shaped recess
49 cover element
50 screw nuts
51 threaded bolt
55 tooth locking unit
56 slide element
57 toothed rim
70 first ball rim part
71 second ball rim part
72 first circular ball track
73 second circular ball track
74 balls
75 disc-shaped recess
80 rotation adjustment device overload protection unit
81 first support element
82 second support element
83 third support element
84 fourth support element
85 slide part
86 cylindrical component
87 spring part
88 spring plate element
89 bore
90 sliding support face

What is claimed is:

1. A utility vehicle seat, comprising:
a seat part, with a backrest part and with a seat substructure for arrangement on a bodywork part of a utility vehicle, in which the seat substructure comprises a rotation adjustment device for rotating at least the seat part with respect to the bodywork part with a ball bearing unit, with a stationary shell part and with a rotating shell part which is rotatable with respect to the stationary shell part, and in which the ball bearing unit includes at least one ball rim part which is arranged between the stationary shell part and the rotating shell part with respect to circular ball tracks of the stationary shell part and the rotating shell part, in such a way that the rotating shell part is arranged supported in a rotatably movable manner with respect to the stationary shell part, wherein a rotation adjustment device overload protection unit includes support elements which are arranged in a stationary manner with respect to the stationary shell part or the rotating shell part and by means of which the rotating shell part and the stationary shell part are additionally capable of being supported with respect to each other when the carrying capacity of one of the circular ball tracks reaches or exceeds a critical deformation value, wherein the support elements are produced in several pieces and comprise a sliding part and a spring part in each case, wherein the sliding part is arranged imbedded inside the spring part.

2. The utility vehicle seat according to claim 1, wherein the support elements are designed in such a way that the support functions thereof start only when the rotating shell part and/or the stationary shell part or one of the circular ball tracks thereof reach or exceed a critical resilient deformation value.

3. The utility vehicle seat according to claim 1, wherein the support elements are arranged without contact with respect to the rotating shell part or the stationary shell part in a non-critical deformation state of the rotating shell part and/or the stationary shell part.

4. The utility vehicle seat according to claim 1, wherein the support elements have in each case a sliding support face which is arranged facing the rotating shell part or the stationary shell part.

5. The utility vehicle seat according to claim 4, wherein the sliding support face is arranged plane-parallel to a sliding plane of the stationary shell part or the rotating shell part.

6. The utility vehicle seat according to claim 1, wherein the support elements are arranged distributed outside the circular ball tracks and in the peripheral direction of the circular ball tracks.

7. The utility vehicle seat according to claim 1, wherein the support elements are produced at least in part from a plastics material or a compound thereof.

8. A utility vehicle seat according to claim 1, characterized in that the support elements are arranged in a sliding manner with respect to the rotating shell part or the stationary shell part in a non-critical deformation state of the rotating shell part and/or the stationary shell part.

9. A utility vehicle seat according to claim 1, wherein the spring part is designed in a form of a disc spring part.

10. A utility vehicle seat according to claim 9, wherein the disc spring part comprises a collar area for support on a carrier component.

* * * * *